Oct. 31, 1972  F. ZOLLNER  3,701,579
HOLOGRAPHIC INTERFERENCE MICROSCOPY
Filed Jan. 29, 1971
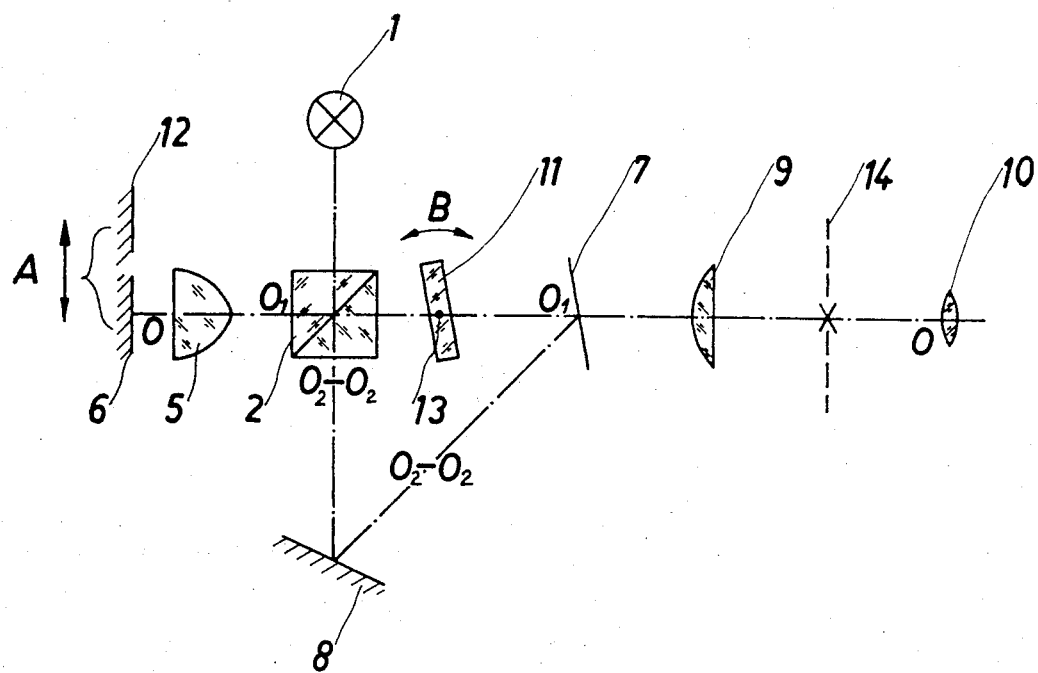
INVENTOR

United States Patent Office 3,701,579
Patented Oct. 31, 1972

3,701,579
HOLOGRAPHIC INTERFERENCE MICROSCOPY
Friedrich Zollner, Jena, Germany, assignor to Jenoptik Jena G.m.b.H., Jena, Germany
Filed Jan. 29, 1971, Ser. No. 103,358
Int. Cl. G02b *21/00, 27/00*
U.S. Cl. 350—12     4 Claims

ABSTRACT OF THE DISCLOSURE

In an interferometer system for micro-observation in incident light, a reference beam and a specimen beam interfere in a hologram which represents an interference image due to superposition of said two beams on one another and substitution of a plane mirror for the specimen under observation. If the magnification is varied by changing the objective, the hologram must also be changed.

---

This invention relates to interference microscopes particularly applicable for micro-observation of technical surfaces under top incident light conditions.

Interference microscopes can be advantageously applied in producing images of large phase structures and/or slow variations in phase and in measuring them. Generally seen there are apart from some specific types two groups of interference microscopes, which depend on whether interference is produced by virtual or real optical wedges. With those microscopes employing virtual wedges a subdivision according to the arrangement of the beam-splitter in the ray path is possible. In viewing all these types of microscopes as to their efficiency those by Linnik show the most favourable results, because with this type of interference microscope there are substantially no limitations as to aperture or magnification compared to those light microscopes producing optically similar images. It is, however, disadvantageous that the two objectives arranged in the two ray paths of the microscope have to be in complete agreement in respect to their optical data, otherwise disturbing irregularities of the interference fringes or lessened contrasts result, which lead to misinterpretations of the interference patterns. The production of such optically perfect objectives is particularly expensive.

If the demand for identical objectives is to be kept in a reasonable range, this range has to be restricted to a mean aperture. Thus the maximum magnification with mass-produced Linnik type microscopes amounts to about $\Gamma=500$, the widest possible aperture being $A=0.65$.

Further improvements in aperture would require complicated multi-lens element objectives and it would be rather difficult to obtain identity of these objectives.

The invention aims at obviating the aforesaid disadvantages of the known systems. It is an object of this invention to provide an interferometer system of high aperture.

It is a further object of the invention to provide an interferometer system of simple construction which operates similarly to an interference microscope.

And it is still a further object of the invention to provide an interferometer system which obviates the difficulties arising out of the production of completely identical microscope objectives which have to be employed one in the path of the reference beam and the other in the path of the sample beam.

To this end, the present invention consists in a interferometer system of high aperture particularly applicable for the inspection of technical surfaces under top incident light conditions, comprising a sample-beam and a reference-beam, the path of the sample-beam including an objective and a mirror which can be substituted for an object to be tested and the path of the reference-beam including at least one deviating plane reflector and a further imaging means, wherein the further imaging means is constituted by a hologram of the wave-field which is due to superposition of said two beams on one another and substitution of a plane mirror for the sample, and said hologram is arranged at the intersection of the sample-beam and the reference-beam.

Preferably, means are provided for substituting the objective and its correlated hologram for another objective and correlated hologram. Advantageously, the beam-splitter from which the two beam paths originate is arranged on the image-side of the objective.

With the system according to this invention it is not only possible to obviate the disadvantages of the Linnik system but to obtain relatively high apertures.

The path of the reference-beam whose optical system is difficult to put into practice only needs to be substituted for a respective hologram.

Furthermore it is possible by the aid of this invention to change over any research microscope into an interference microscope. The microscope objective and the reference plane only have to be provided with the respective hologram.

In order that the invention may be more readily understood, reference is made to the accompanying drawing which illustrates diagrammatically and by way of example, one embodiment thereof.

The light from a monochromatic light source 1 (for instance a laser) impinges on a cube beam-splitter 2 where it is split into two paths, the path of the sample-beam having an optical axis $O_1$—$O_1$ and the path of the reference-beam having an optical axis $O_2$—$O_2$. After being split the sample-beam passes an objective 5 and illuminates an object 6 to be tested which is arranged in the front focal plane. On the preferably plane surface of the object 6 the sample beam is reflected back to the objective 5 as well as to the cube beam-splitter 2 and interferes after passage through a photographic-plate 7 with the reference-beam, which originates from the cube beam-splitter 2, and which after having been deviated at a mirror 8 (or at a plurality of mirrors) is diffracted by the interference pattern of the photographic-plate 7.

The resulting interferences can be observed by means of an ocular 10 either directly or after an intermediate image has been produced by a lens 9 in a plane 14. The objective 5, the lens 9 and the ocular 10 have an optical axis O—O in common.

The interference pattern of the photographic-plate 7 represents a hologram, produced at the photographic-plate 7 when the incoming light of the sample-beam and of the reference-beam interfere, but only if a plane mirror 12 is put in place of the object 6. The mutual exchangeability of the mirror 12 and the object 6 is illustrated in the diagram by a bracket comprising the mirror and the object and by a double-arrow A. Accordingly the hologram contains information on the total wave-field of the sample beam which comprises the objective 5 and the object 6 which is a substitute for the mirror 12 and whose reflecting face is employed as a reference plane. The wave-field of the sample-beam influenced by the reference plane is reproduced if the hologram of the photographic-plate 7 is illuminated. On the other hand said wave-field interferes with that wave-field influenced by the object 6 to be measured. The position of and the distances between the interference fringes are either adjusted by tilting a sheet of glass 11, arranged between the objective 5 and the photographic-plate 7, in the direction indicated by a double arrow B, around an axis 13, which is positioned at right angles to the drawing plane, or in tilting the object 6 to be measured or by displacing the objective 5 and the object 6 in the direction indicated by the double arrow A.

The surface structure as well as the surface roughness of the object 6 can be determined in per se known manner from the interference pattern and/or from the distances between two adjacent interference fringes. In order that the magnification of the interferometer system can be varied the objective 5 and its correlated hologram of the photographic-plate 7 are exchangeably arranged and can be substituted for other objectives and their correlated holograms.

It is advantageous to apply a thermic radiator as a light source for reproducing a wave-field from a hologram.

Thus the resolving power of the objective 5 is fully exploited which is, for example, necessary in measurements on "super-smooth" surfaces. A granulation structure of the interference pattern resulting from the coherent light is obviated by use of the thermic radiator, whose light must, of course, be of the same wave-length as the coherent light.

A detailed representation on the origin of the hologram at the photographic-plate 7 has not been given because it may be presumed a well-known fact. For example, reference is made to the publication "Theory and Application of Holography" by J. B. De Velies and G. O. Reynolds, published by Addison-Wesley, London, 1967.

I claim:

1. Interferometer system for micro-observation in incident light, comprising a light-source
   an objective
   an ocular
   a beam-splitter
   a plane mirror said beam splitter splitting the light from said light-source into a sample beam and a reference beam,
   the sample beam illuminating the viewed object via said objective,
   the viewed sample being exchangeable with said plane mirror in the front focal plane of said objective,
   at least one reflector for the deviation of the reference beam for interference with the sample beam after reflection by the sample and passage through said beam splitter,
   a hologram at the place of interference of the reference beam with the sample beam between said beam splitter and said ocular,
   said hologram representing an interference image of a wave-field obtained by superposition of the sample beam and the reference beam in the plane of interference and substitution of said plane mirror for the sample,
   said ocular, said beam splitter, said hologram and said objective having a common axis and serving for the observation of the interference fringes,
   the interference fringes being produced at the place of said hologram by interference of the sample beam with the reference beam after deflection of the reference beam by said hologram,
   and a rotatable glass plate located in the path of the sample beam between said objective and said hologram for adjustment of the interference fringes and the relative positions thereof, 2. Interferometer system according to claim 1, including means for adjusting the interference pattern and the distance between two adjacent interference fringes.

3. Interferometer system according to claim 2 including means between said hologram and said ocular for producing an intermediate image of the interference fringes.

4. Interferometer system according to claim 3, wherein said objective and its correlated hologram are exchangeably arranged and can respectively be substituted for said objective and another hologram.

References Cited

UNITED STATES PATENTS 3,511,554   5/1970   Osterberg et al. _____ 350—3.5

FOREIGN PATENTS 1,929,981   1/1970   Germany _____ 350—3.5

OTHER REFERENCES

Brooks, Electronics, vol. 40, No. 10, May 1967, pp. 88–93.

DAVID SCHONBERG, Primary Examiner

R. J. STERN, Assistant Examiner

U.S. Cl. X.R.

350—3.5; 356—106 R